United States Patent [19]

Macdonald

[11] Patent Number: 4,969,543

[45] Date of Patent: Nov. 13, 1990

[54] SLIPPING BYPASS CLUTCH CONSTRUCTION FOR A HYDROKINETIC TORQUE CONVERTER

[75] Inventor: Fraser J. Macdonald, Farmington Hills, Mich.

[73] Assignee: Ford Motor Co., Dearborn, Mich.

[21] Appl. No.: 377,032

[22] Filed: Jul. 10, 1989

[51] Int. Cl.[5] .................. F16H 45/02; F16D 13/72
[52] U.S. Cl. ..................... 192/3.29; 192/113 B
[58] Field of Search ............... 192/3.28, 3.29, 3.3, 192/113 B, 107 R

[56] References Cited

U.S. PATENT DOCUMENTS

| | | | |
|---|---|---|---|
| 3,048,250 | 8/1962 | Kershner | 192/107 R |
| 3,213,983 | 10/1965 | Smirl et al. | 192/3.3 |
| 3,252,352 | 5/1966 | General et al. | 74/645 |
| 4,153,147 | 5/1979 | Chana | 192/3.29 X |
| 4,194,604 | 3/1980 | Nichols et al. | 192/3.3 |
| 4,240,532 | 12/1980 | Blomquist | 192/3.28 |
| 4,353,444 | 10/1982 | Bionaz | 192/3.28 X |
| 4,445,599 | 5/1984 | Bopp | 192/3.29 |
| 4,468,988 | 9/1984 | Hiramatsu | 74/732 X |
| 4,469,206 | 9/1984 | Motomura et al. | 192/3.28 |
| 4,509,389 | 4/1985 | Vahratian et al. | 74/705 X |
| 4,512,449 | 4/1985 | Motomura et al. | 192/3.28 |
| 4,694,941 | 9/1987 | Hall et al. | 192/3.28 |
| 4,706,790 | 11/1987 | Lockhart et al. | 192/3.3 |
| 4,785,924 | 11/1988 | Jackel | 192/3.28 X |

FOREIGN PATENT DOCUMENTS

| | | | |
|---|---|---|---|
| 2551270 | 5/1976 | Fed. Rep. of Germany ... | 192/113 B |
| 0030532 | 2/1983 | Japan | 192/3.28 |

Primary Examiner—Rodney H. Bonck
Attorney, Agent, or Firm—Donald J. Harrington; Frank G. McKenzie; Keith L. Zerschling

[57] ABSTRACT

A hydrokinetic torque converter and lockup clutch assembly comprising an impeller housing and a clutch construction situated within the housing comprising a clutch plate in the form of a piston having formed thereon an annular friction surface, a friction disc located between the friction surface on the clutch plate and an adjacent wall of the impeller housing and having an inner margin secured to the impeller housing at a location radially inward of the friction surface, friction material formed on the friction disc and flow passage means for establishing a circuitous cooling oil flow path across the dynamic friction surfaces of the clutch to establish cooling and for eliminating wear as the pressure in the clutch control pressure chamber is modulated to effect a continuous slipping of the clutch surfaces during operation of the converter, the friction disc providing a shield that minimizes heat transfer to the impeller housing and for providing maximum compliance of the face of the friction surface with respect to the friction material carried by the friction disc.

6 Claims, 6 Drawing Sheets

SLIPPING BYPASS CLUTCH CONSTRUCTION FOR A HYDROKINETIC TORQUE CONVERTER

BACKGROUND OF THE INVENTION

A hydrokinetic torque converter transaxle is described in U.S. Pat. No. 4,509,389, which is assigned to the assignee of my invention. That transaxle includes a torque converter having an impeller and a turbine. The housing for the impeller includes a lockup clutch assembly having a clutch plate that engages a friction surface on the impeller housing. The clutch plate carries friction material that establishes a frictional driving connection between the impeller and the turbine when the pressure differential across the clutch plate is sufficient to establish a clutch engaging force.

The clutch plate is connected through a damper assembly to the hub of the turbine, thus establishing a mechanical torque transfer between an engine crankshaft and the turbine shaft which bypasses the hydrokinetic torque flow path through the torque converter.

Converter lockup clutch constructions are well known in the art, an early prior art teaching being described in U.S. Pat. No. 3,252,352, which is assigned to the assignee of this invention. Another example of early prior art torque converter assemblies having a lockup clutch is disclosed in U.S. Pat. No. 3,541,893.

More recent prior art teachings include means for controlling the application of the torque converter clutch by means of an electronic controller that establishes a modification of the clutch engaging force under certain operating conditions-for example, during shifts when it is desired to eliminate undesired torque fluctuations and engine speed changes during transient periods when torque flow interruption is desired. The electronic controller establishes a pressure force on the clutch plate that is adequate to meet the transient torque transmission requirements of the driveline. Examples of this are shown in U.S. Pat. Nos. 4,560,043 and 4,301,900.

Prior art U.S. Pat. No. 4,541,893, which also is assigned to the assignee of this invention, includes a clutch capacity modulator valve that establishes a desired pressure in the clutch pressure control chamber defined by the impeller housing and the clutch plate. The controls for establishing the clutch capacity is intended to eliminate excess torque capacity so that the clutch will be maintained in the engaged condition under driving conditions when clutch engagement is desired, but excess clutch capacity is avoided by controlling the pressure differential across the clutch plate. This contributes to more precise lockup clutch control and eliminates undesired torque fluctuations upon clutch application and release.

It also is known in the prior art to effect a continuous slipping of a lockup clutch or bypass clutch for a hydrokinetic torque converter by continuously modulating the pressure that controls the clutch. An example of a continuously slipping bypass clutch that is actuated by the pressure in the torus circuit of the converter is disclosed in prior art U.S. Pat. No. 4,468.988. Another example is disclosed in U.S. Pat. No. 4,662,488.

In those instances when the clutch is allowed to slip continuously rather than engaging to establish a full lockup condition, a relatively large heat dissipation is necessary because of the heat energy that is developed by reason of the dynamic friction torque. This tends to cause instability of the clutch because the annular friction surfaces of the clutch tend to go out of flat. Further, heat spots develop in the impeller housing. Most of the heat that is generated because of the slipping condition of the friction surfaces is transferred directly into the cover for the impeller. Furthermore, the friction surface on the cover requires precise machining and polishing during manufacture. This makes it necessary to use metal stock thickness greater than otherwise would be needed.

The prior art designs also are deficient with respect to the ability of the converter to transfer heat energy into the fluid within the torus circuit. Also the instability of the clutch due to heat distortion makes controlling of the clutch torque capacity difficult.

BRIEF DESCRIPTION OF THE INVENTION

My invention eliminates the disadvantages outlined in the preceding discussion with respect to the modulated, continuously-slipping bypass clutches for use in hydrokinetic torque converters. My design includes a simple friction disc comprising a steel core with friction material bonded to one side of the steel core. The disc is secured to the inner wall of the converter housing so that it will rotate with the converter housing. The steel core and the friction material provide a shield that protects the housing and reduces significant heat transfer to the housing, which could cause distortion.

My improved design also eliminates hot spots on the friction material and on the face of the clutch piston. Maximum compliance between the registering friction surfaces of my improved clutch construction eliminates the necessity for finish machining and polishing of the frictional surfaces on the housing.

I have provided a circuitous oil flow passage in the friction material that is bonded to the steel disc. Grooves in the friction material establish a uniform flow distribution pattern across the friction surfaces without causing an excessive pressure drop, thereby making it possible to maintain a controlled clutch pressure in the clutch control pressure chamber. The groove pattern is designed to establish a relatively large cooling fluid flow across the friction surfaces while still maintaining a desired sealing action. That permits maintenance of a controlled pressure drop across the piston plate.

The oil flow grooves have a pattern that includes a radial flow as well as a circumferential flow so that the entire friction surface is adequately fed with cooling oil. Cooling oil exits through radial grooves thus providing uniform temperature distribution across the friction surfaces.

PARTICULAR DESCRIPTION OF THE INVENTION

For the purpose of describing the environment for the improved construction of my invention, I will describe a prior art torque converter construction with a lockup clutch. The torque converter of the prior art includes a damper assembly that is capable of cushioning the lockup clutch plate as it engages. It also includes a friction coulomb characteristic which modifies the spring forces in the damper assembly. Although such a damper assembly is used in the structural environment of the invention disclosed in this specification it is possible that under some circumstances it is not necessary to use a damper to establish a driving connection between the turbine shaft and the clutch plate since torsional fluctuations in the torque transmission from the engine to the turbine shaft can be absorbed by the modulated slipping bypass clutch.

Figure 1:
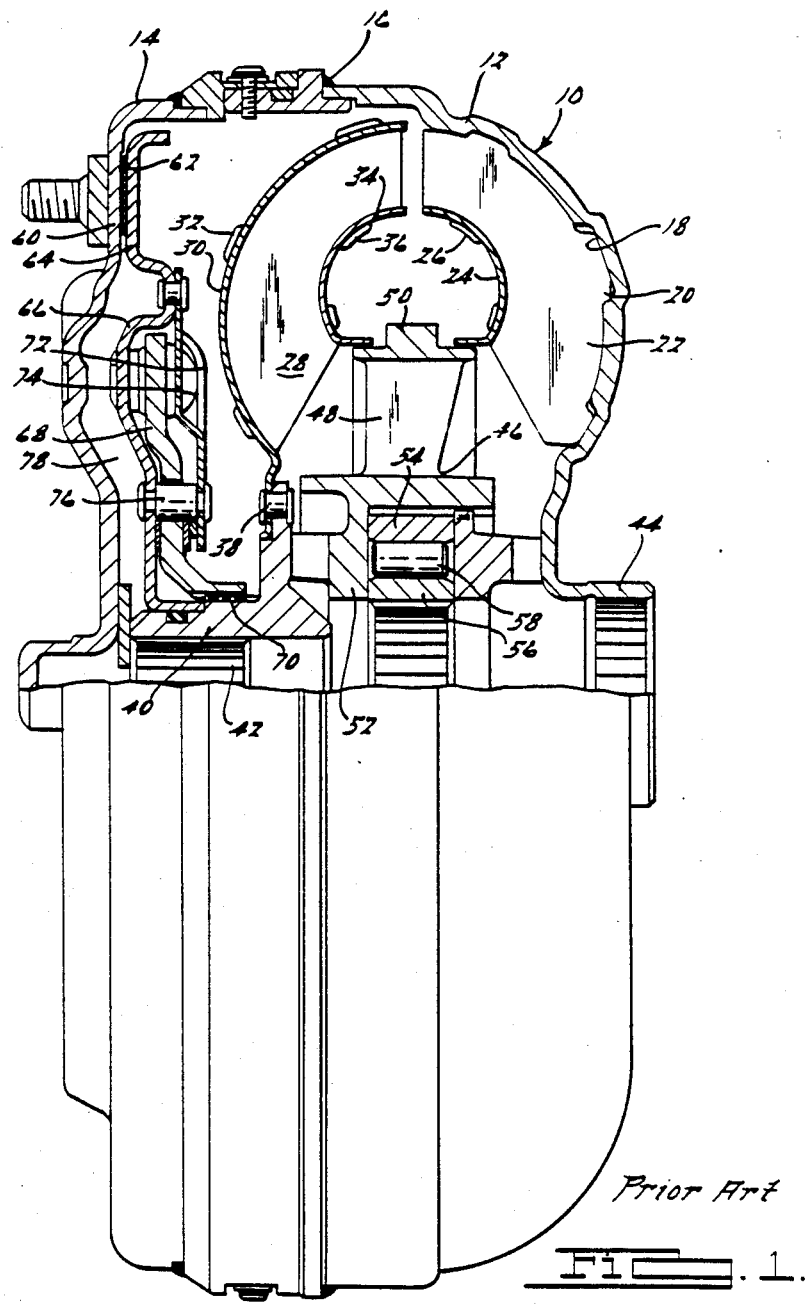
FIG. 1 is a view of a prior art clutch construction of the kind shown in U.S. Pat. No. 4,509,389.
Figure 2:
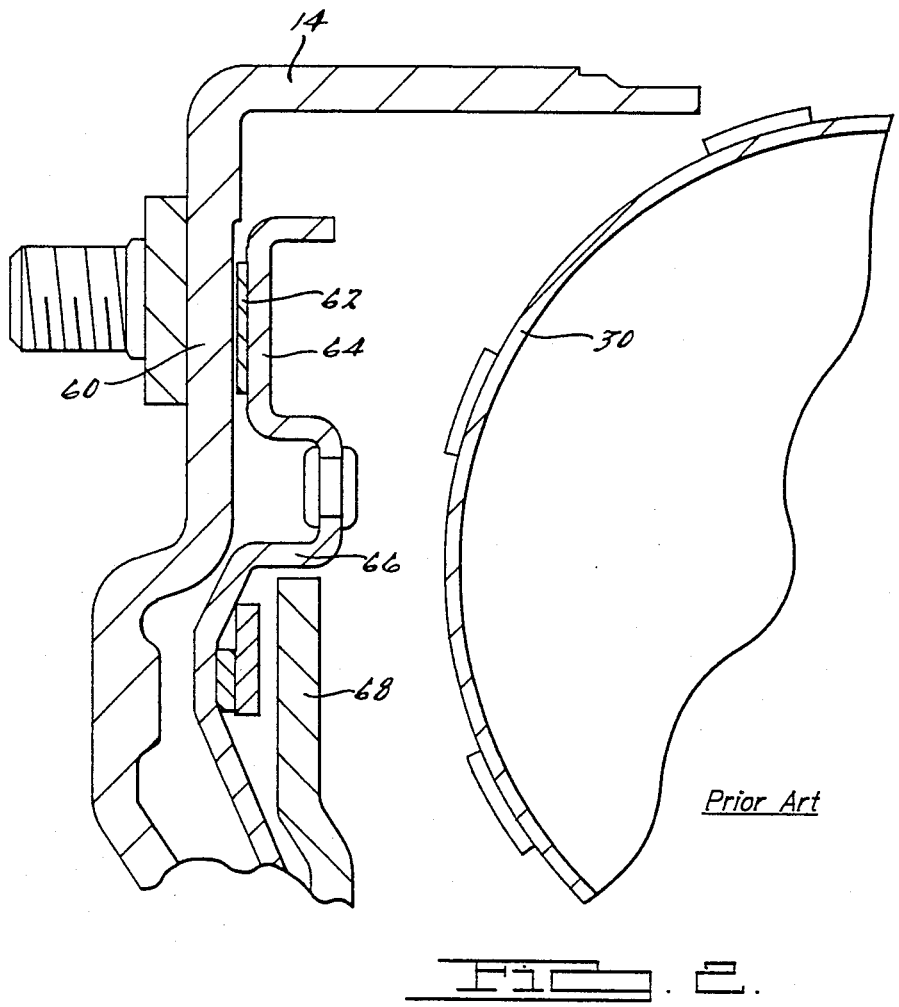
FIG. 2 is an enlarged cross-sectional view of a portion of the prior art construction of FIG. 1.

Prior Art Design of FIGS. 1 and 2

FIG. 1 shows a torque converter 10 having an impeller shell 12. This shell is joined at its outer margin to an impeller cover 14, which is secured to the impeller shell 12 by weld 16.

The impeller shell 12 has recesses 18 that receive tabs 20 on radial outflow impeller blades 22. An inner shroud 24 has circumferentially spaced apertures that receive tabs 26. The blades thus are retained between the shell 12 and the inner shroud 26.

Turbine blades 28 are arranged in juxtaposed radial inflow disposition with respect to the blades 22. The blades are retained by a turbine shell 30 which has apertures that receive tabs 32 formed on the turbine blades 28. A circular inner turbine shroud generally similar to the impeller shell 24 is shown at 34. It has slots that receive tabs 36 on the inner margin of the blades 28. Thus the blades 28 are held together to define radial inflow passages that are a part of a toroidal fluid flow circuit.

The radially inward portion of the turbine shell 30 is secured by rivets 38 to turbine hub 40, which has internal splines 42 to permit a driving connection with a turbine shaft in the manner taught by U.S. Pat. No. 4,509,389.

Impeller shell 12 has a hub 44 that is adapted to be journalled on a stationary sleeve shaft that forms a part of the transmission housing that is taught by U.S. Pat. No. 4,509,389.

Bladed stator assembly 46 includes stator blades 48 disposed between the flow exit section of the turbine and the flow entrance section of the impeller. An inner stator shroud 50 surrounds the radially outward ends of the stator blades 48. A stator hub which carries the blades 48 is shown at 52. An outer overrunning brake race 54 is secured within an opening in the hub 52. An inner overrunning brake race 56 has internal splines to permit a connection with the aforesaid stationary sleeve shaft. Overrunning clutch roller elements 58 establish a one way braking action between the races, the outer race being cammed to cooperate with the individual roller elements in known fashion.

Cover 14 has a radially extending portion 60 at its outer margin. The inner surface 62 of the portion 60 serves as a friction surface. It is adapted to be engaged by friction material carried by the radially outward portion 64 of a clutch plate 66. The clutch plate is adapted to be connected to turbine hub 40 by means of a damper assembly of the kind described in U.S. Pat. Nos. 2,574,573 and 4,304,107.

The damper assembly comprises a driven plate 68 which is splined at 70 to the turbine hub 40. A cover plate 72 of the damper assembly cooperates with the piston plate 66 to define an enclosure for tangentially disposed damper springs 74. These are arranged in spring pockets formed in the outer portion of the driven plate 68. Torque is transmitted from the plate 66 to the driven plate 68 through the tangentially disposed springs. Spacers 76 join the plate 72 with the plate 66. They extend through slotted openings formed in the drive plate 68 to permit limited axial displacement of the drive plate 66 with respect to the driven plate 68.

The chamber 78 defined by the cover 60 and clutch plate 66 is a control pressure chamber which communicates with a control pressure source in the manner described in U.S. Pat. No. 4,633,738, which is assigned to the assignee of this invention. By controlling the pressure in chamber 78, the pressure differential across the clutch plate 66 can be controlled. The pressure in the torus flow cavity on the right hand side of the piston plate 66 will cause the friction surfaces on the cover 60 and on the clutch plate 66 to become frictionally engaged. By appropriately modulating the pressure in chamber 78, a controlled slipping will occur between the friction surfaces whereby torque fluctuations developed in the driveline due to engine perturbations and other torque transmitting irregularities can be absorbed. The thermal energy that is developed by reason of this slipping action can be controlled by means of my invention. This will be described in the following portions of the specification.

Figure 3A:
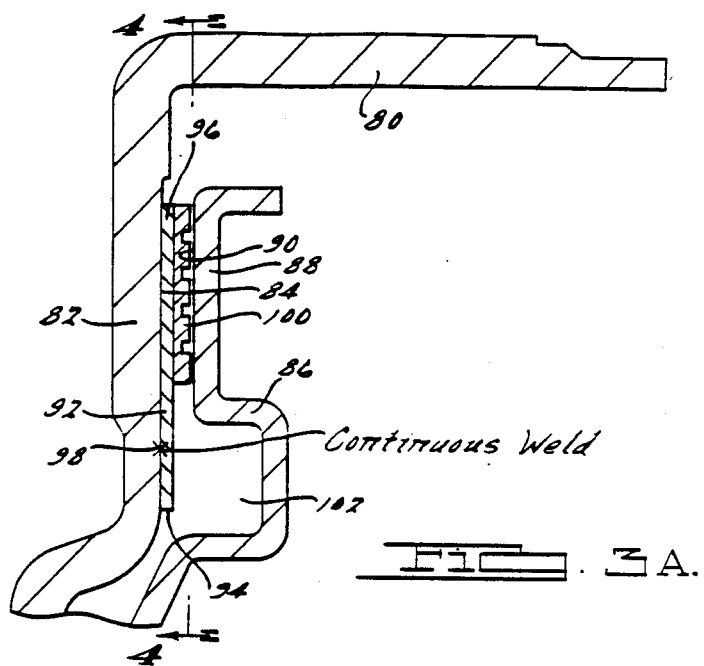
FIG. 3A is a cross-sectional view corresponding to the cross-sectional view of FIG. 2 showing a first embodiment of the improvements of my invention.
Figure 4:
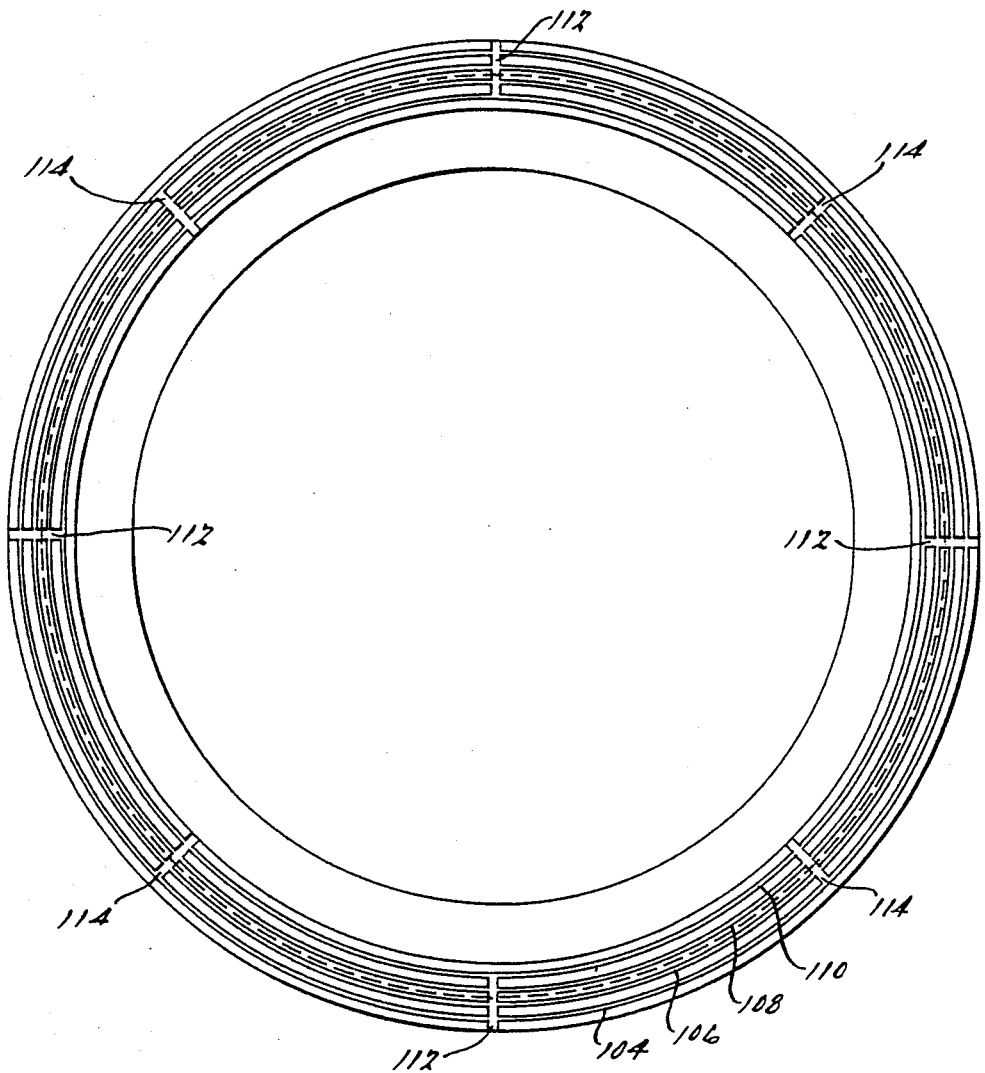
FIG. 4 is a view showing the friction disc as seen from the plane of section line 4—4 of FIG. 3A.

Embodiment of FIGS. 3A and 4

In FIG. 3A the radially outward part of the torque converter cover is shown at 80. This corresponds to the cover 14 of FIG. 1. The cover includes a radially extending portion 82 having a flat annular inner surface 84. A clutch plate 86 has a peripheral portion 88 on which is formed a friction surface 90.

A friction disc 92 comprises an annular disc with an inner margin 94 and an outer margin 96. The inner margin is welded to the surface 84 by means of a continuous weld, as shown at 98. Bonded to the disc 92 is friction material 100. The composition of the friction material is commonly referred to as "paper face" material. It is bonded to the steel disc 92 by a bonding technique described by Frosbie, Milek and Smith in SAE Design Practices, Vol 5, (1962).

When the clutch plate 86 engages the friction material 100, the engaging surfaces tend to seal the control pressure chamber 102 from the torus circuit. Because the weld 98 is a continuous weld, it acts as a seal which prevents transfer of fluid under pressure from the torus circuit to the lower pressure control pressure chamber 102.

As seen in FIG. 4, the friction material 100 has formed therein four concentric annular grooves 104, 106, 108 and 110. These grooves can be machined by turning or they may be formed by pressing a die on the face of the disc during the formation of the disc as the friction material is pressure bonded to the steel disc 94. The friction material 100 is formed also with radial grooves located 45 degrees apart as indicated in FIG. 4. The radial grooves at the 12:00, 3:00, 6:00 and 9:00 o'clock positions communicate with the radially outward region of the clutch and interconnect each of the four concentric grooves. The alternately spaced radial grooves situated between each of the aforesaid radial grooves do not communicate with the radially outward region, but they do communicate with the radially inward region. They also interconnect each of the four annular grooves. The radial grooves that communicate with the radial outward region are indicated by reference character 112, and the radial grooves that communicate with the radial inward region are indicated by reference character 114.

Fluid in the torus cavity of the converter is under a pressure that is higher than the pressure in the chamber 102. Thus the fluid tends to flow radially inward through the grooves 112 where it is transferred to the circumferential grooves. The fluid then travels circumferentially to the adjacent grooves 114. From there the fluid is transferred to the radial inward region to the pressure chamber 102.

Fluid thus circulates continuously across the friction surfaces during operation of the clutch in an engaged condition as it is slipping, and the fluid is transferred circumferentially through the grooves thereby creating a maximum cooling effect. Heat is dissipated to the fluid and carried to chamber 102 and the control system where it is transferred to a cooler and then recirculated to the inlet side of the control pump for the transmission. The control pump supplies control pressure to the control system, as the control system establishes the regulated pressure levels in the torus circuit and in the chamber 102.

Because the friction material does not engage directly the cover 80 nor the radially extending portion 82, transfer of the heat generated during dynamic slipping of the clutch with respect to the casing or cover is minimized. Furthermore, because of the use of the plate or disc 92, it is possible to maintain precise flatness of the friction surfaces on the friction material 100 and on the clutch plate portion 88.

Figure 5:
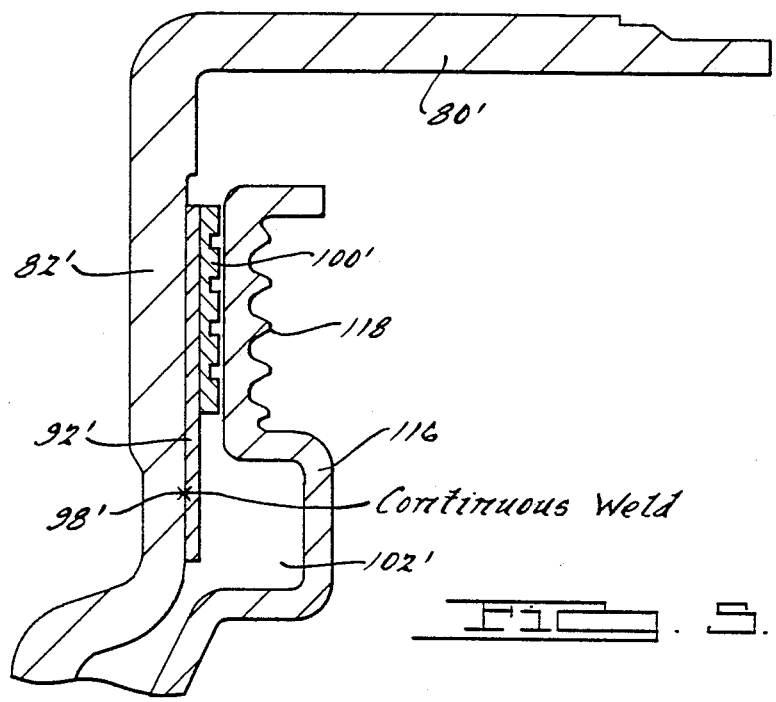
FIG. 5 is a cross-sectional view showing a third embodiment of my invention wherein a continuous weld is used to secure the friction disc to the inner wall of the converter housing.

Embodiment of FIG. 5

FIG. 5 shows a modification of the structure shown in FIG. 3A. Like the structure shown in FIG. 3A, the clutch of FIG. 5 comprises a steel disc as shown at 92'. It is welded by means of a continuous weld 98' to the radial portion 82' of cover 80'. The clutch plate 116 shown in FIG. 5, which corresponds to the clutch plate 86 shown in FIG. 3A, includes cooling fins 118 that are machined in the back or inactive face of the clutch plate 116. These fins increase the surface area over which the fluid in the torus circuit is exposed thereby facilitating transfer of heat from the clutch plate through the circulating fluid. Grooves 118 are concentric grooves located directly adjacent the friction material 100'.

Figure 3B:
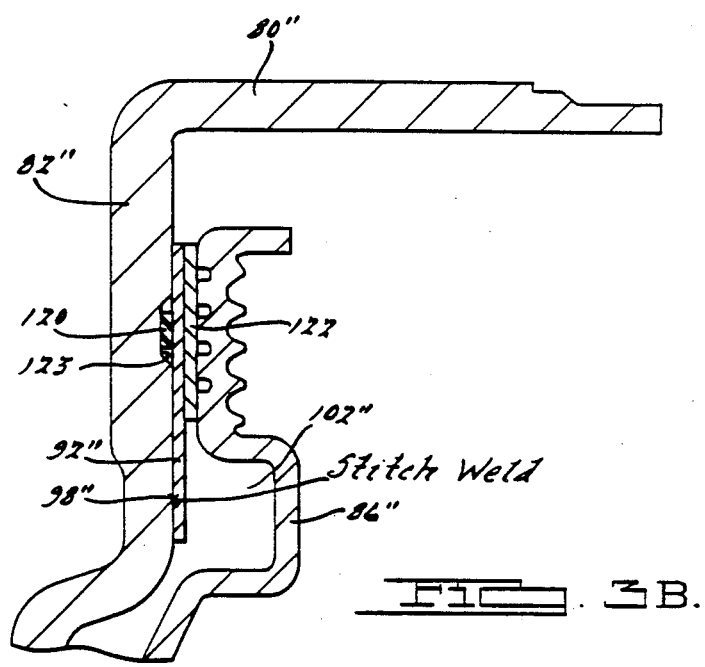
FIG. 3B is a second embodiment of the invention wherein a static seal is added to the construction of FIG. 3A and cooling grooves are added to the piston plate.

Embodiment of FIG. 3B

In the embodiment of FIG. 3B a static seal ring 120 is located in an annular recess 123 formed in the radial portion 82'' of the cover 80''. Unlike the design of FIG. 5, the steel friction disc 92'' is not welded by means of a continuous weld. Thus there is a possibility that fluid may leak radially inward by reason of the differential pressure in the torus circuit with respect to the pressure in the control pressure chamber 102''. The static seal ring, however, prevents undesired leakage in a radial direction across the clutch surfaces. The static seal ring is compressed by the disc 92''.

Friction material 122 is bonded to the steel disc 92''. Unlike the friction material 100 of the design shown in FIG. 3A, the friction material 122 does not have annular grooves nor radial grooves. Instead annular grooves and radial grooves are formed in the friction surface of the clutch plate 86''. The pattern of the grooves in the clutch plate are generally the same as the pattern of the grooves shown in FIG. 4.

Figure 6:
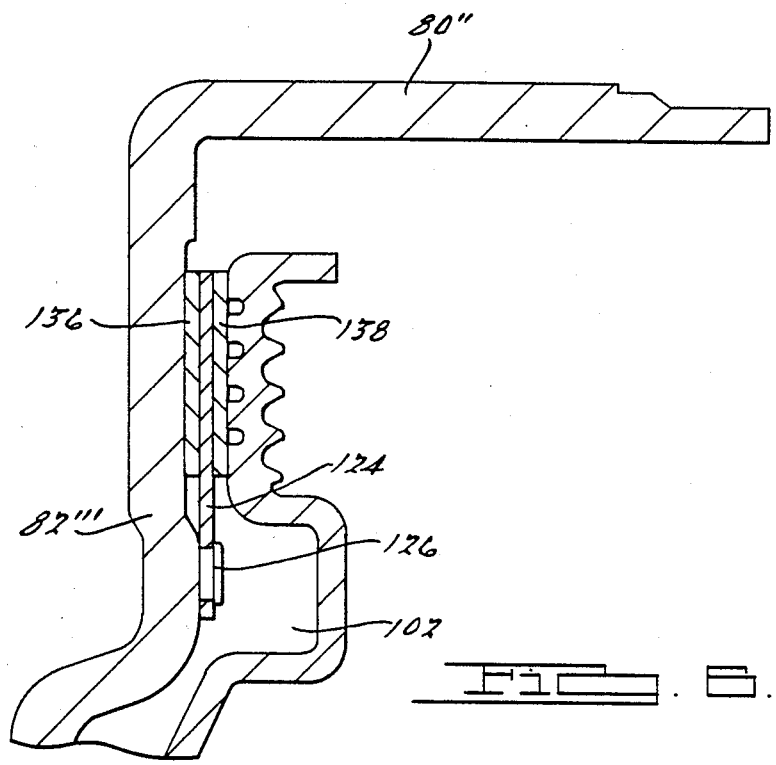
FIG. 6 is another embodiment of the invention wherein the friction disc is secured by rivets or the like to the inner wall of the torque converter housing and wherein frictional material is formed on each of the two faces of the friction disc.
Figure 7:
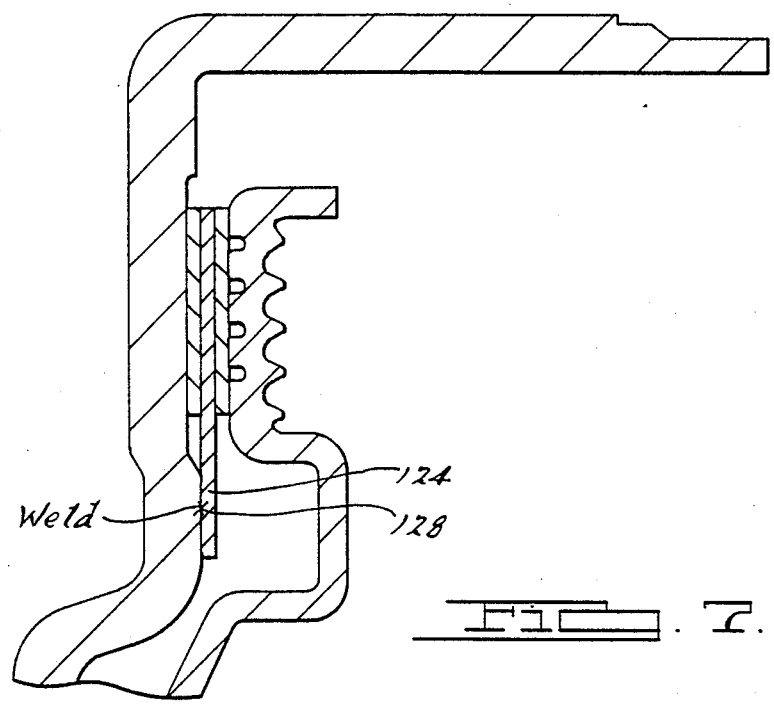
FIG. 7 is another embodiment similar to the embodiment of FIG. 6 wherein the friction disc is secured to the inner wall of the housing by welding rather than by rivets.
Figure 8:
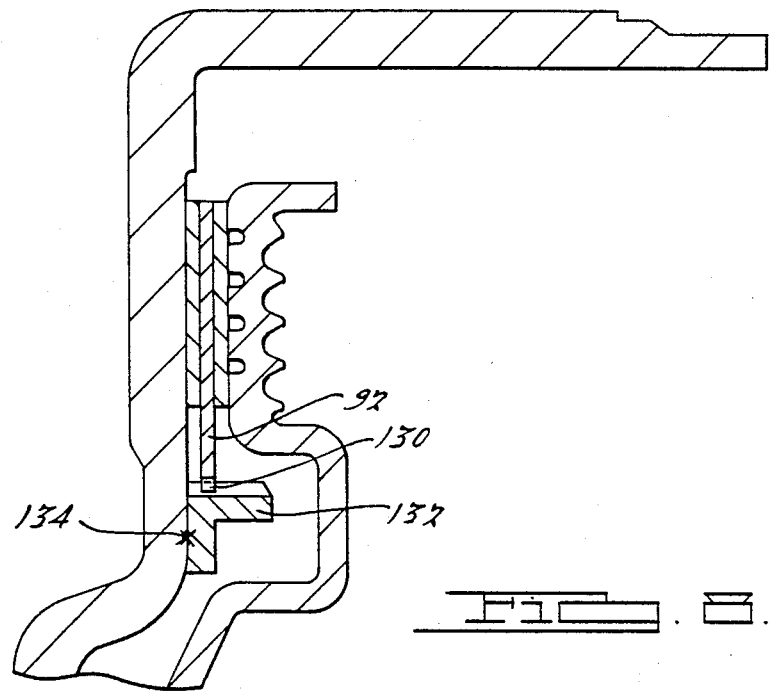
FIG. 8 is another embodiment of the invention similar to FIG. 6 wherein the friction disc is secured to the inner wall of the housing by means of a splined connection.

Embodiments of FIGS. 6, 7 and 8

A steel friction disc 124 is secured to the radially outward portion 82''' of the converter cover 80''' by rivets 126 in the FIG. 6 construction. It is secured by welding 128 in the embodiment of FIG. 7. It is secured by means of an internal and external spine connection 130 in the embodiment of FIG. 8.

In the embodiment of FIG. 8 external spines are formed on clutch element 132, which is welded at 134 to the converter cover. The external spines on the element 132 register with internal spines formed on the disc 124.

Friction material in the embodiments of FIGS. 6, 7, and 8 is formed on each of the sides of the disc 124 as shown at 136 and 138. Friction material 136 is a static seal that prevents radial flow of fluid under the differential pressure of the control chamber 102 with respect to the pressure in the torus circuit of the converter. This eliminates the need for providing a continuous weld as in the embodiment of FIG. 3A and the need for providing a static seal as in the embodiment of FIG. 3B.

The clutch piston in the embodiments of FIGS. 6, 7, and 8 is of the same design as the clutch piston in the embodiment of FIG. 3B. Thus it has a groove pattern to accommodate the circulation of fluid across the frictional surfaces. It also has cooling fins located on the side of the clutch piston most proximate to the torus circuit thereby increasing the surface area over which the converter fluid circulates.

Having described preferred embodiments of my invention, what I claim a desire to secure by U.S. Letters patent is:

1. In a lockup clutch for a torque converter comprising an impeller shell enclosing a hydrokinetic turbine, an impeller and a lockup clutch plate connected to said turbine;

an annular friction disc having one margin located at a radially outward location, means for securing a second margin to the interior of said shell, and friction material on said disc adjacent a radially outward portion of said plate;

said disc being connected to said shell by a continuous well to effect a seal to prevent radial flow of fluid across said disc between said shell and said disc.

2. In a bypass clutch for a hydrokinetic torque converter comprising a turbine and an impeller adapted to be connected to an engine and a friction clutch plate, said converter having an impeller shell enclosing said impeller and turbine, a torus flow circuit defined by said impeller and said turbine, the improvement comprising;
- a friction disc located in said shell at a radially outward location, said friction disc being flat and annular and having an inner annular margin and an outer annular margin, friction material carried on said disc between the annular margins, said disc being connected to said shell at a location proximate to the inner annular margin of said disc;
- said clutch plate having an annular friction surface at a radially outward location adjacent the friction material of said disc, said plate being connected to said turbine;
- a control pressure chamber defined by said shell and said clutch plate, said clutch plate being subjected to the pressure differential across said plate to maintain the friction material and said friction surface in slipping frictional engagement thereby establishing a bypass torque flow path through said converter;
- and annular grooves formed at the interface of the friction material and the friction surface of said plate, said grooves being connected by first radial grooves that communicate with the interior of said shell at a location radially outward of said disc and second radial grooves that communicate with said pressure chamber.

3. In a bypass clutch for a hydrokinetic torque converter comprising a turbine and an impeller adapted to be connected to an engine and a friction clutch plate, said converter having an impeller shell enclosing said impeller and turbine, a torus flow circuit defined by said impeller and said turbine, the improvement comprising;
- a friction disc located in said shell at a radially outward location, said friction disc being flat and annular and having an inner annular margin and an outer annular margin, friction material carried on said disc between the annular margins, said disc being connected to said shell at a location proximate to the inner annular margin of said disc;
- said clutch plate having an annular friction surface at a radially outward location adjacent the friction material of said disc, said plate being connected to said turbine;
- a control pressure chamber defined by said shell and said clutch plate, said clutch plate being subjected to the pressure differential across said plate to maintain the friction material and said friction surface in slipping frictional engagement thereby establishing a bypass torque flow path through said converter;
- and annular grooves formed in said friction material, said grooves being connected by first radial grooves that communicate with the interior of said shell at a location radially outward of said disc and second radial grooves that communicate with said pressure chamber.

4. In a bypass clutch for a hydrokinetic torque converter having a turbine and an impeller adapted to be connected to an engine and a friction clutch plate, said converter having an impeller shell enclosing said impeller and turbine, a torus flow circuit defined by said impeller and said turbine, the improvement comprising:
- a friction disc located in said shell at a radially outward location, said friction disc being a flat, annular disc having an inner margin and an outer margin, friction material carried on said disc between said margins, said disc being connected to said shell at a location proximate to one margin of said disc;
- said clutch plate having an annular friction surface at a radially outward location adjacent the friction material of said disc, said plate being connected to said turbine;
- a control pressure chamber defined by said shell and said clutch plate, said clutch plate being subjected to pressure differential across said plate to maintain the friction material and said friction surface in slipping frictional engagement thereby establishing a bypass torque flow path through said converter;
- said disc being connected to said shell by a continuous weld to effect a seal that prevents radial flow across said disc between said shell and said disc.

5. In a lockup clutch for a torque converter comprising an impeller shell enclosing a hydrokinetic turbine and impeller and a lockup clutch plate in said shell connected to said turbine;
- an annular friction disc having an inner margin located at a radially outward location, means for securing said inner margin to the interior of a wall of said shell and friction material on said disc adjacent a radially outward friction surface of said plate;
- said plate and said shell wall defining a control pressure chamber, said shell defining a torus circuit cavity;
- means for sealing said cavity with respect to said control pressure chamber; and
- annular grooves formed at the interface of the friction material and the friction surface of said plate, said grooves being connected by first radial grooves that communicate with the interior of said shell at a location radially outward of said disc and second radial grooves that communicate with said pressure chamber;
- said disc being connected to said shell by a continuous welded connection to effect a seal to prevent radial flow of fluid across said friction disc between said shell wall and said friction disc.

6. In a lockup clutch for a torque converter comprising an impeller shell enclosing a hydrokinetic turbine and impeller and a lockup clutch plate in said shell connected to said turbine;
- an annular friction disc having an inner margin located at a radially outward location, means for securing said inner margin to the interior of a wall of said shell and a friction surface on said disc adjacent a radially outward friction surface of said plate;
- said plate and said shell wall defining a control pressure chamber, said shell defining a torus circuit cavity;
- means for sealing said cavity with respect to said control pressure chamber, and annular grooves formed at the interface of said friction surfaces, said grooves being connected by first radial grooves that communicate with the interior of said shell at a location outward of said disc and second radial grooves that communicate with said pressure chamber;
- said disc being connected to said shell by a continuous welded connection to effect a seal to prevent radial flow of fluid across said friction disc between said wall and said friction disc.

* * * * *